US011178020B2

(12) United States Patent
Barton et al.

(10) Patent No.: US 11,178,020 B2
(45) Date of Patent: Nov. 16, 2021

(54) VIRTUAL REALITY FOR NETWORK CONFIGURATION AND TROUBLESHOOTING

(71) Applicant: Cisco Technology, Inc., San Jose, CA (US)

(72) Inventors: Robert E. Barton, Richmond (CA); Jerome Henry, Pittsboro, NC (US); John Apostolopoulos, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 16/393,366

(22) Filed: Apr. 24, 2019

(65) Prior Publication Data

US 2020/0344131 A1    Oct. 29, 2020

(51) Int. Cl.
*H04L 12/24* (2006.01)
*G06T 19/00* (2011.01)

(52) U.S. Cl.
CPC .......... *H04L 41/22* (2013.01); *G06T 19/006* (2013.01); *H04L 41/0813* (2013.01); *H04L 41/12* (2013.01); *H04L 41/14* (2013.01)

(58) Field of Classification Search
CPC ......... H04L 41/22; H04L 41/12; H04L 41/14; H04L 41/0813; G06T 19/006
USPC ......................................................... 709/223
See application file for complete search history.

(56) References Cited

U.S. PATENT DOCUMENTS

| | | | |
|---|---|---|---|
| 6,201,542 B1 * | 3/2001 | Arai ................. | G06T 17/20 345/419 |
| 6,789,090 B1 * | 9/2004 | Miyake ............. | H04L 41/0213 707/959 |
| 7,139,819 B1 * | 11/2006 | Luo .................. | H04L 41/06 709/223 |
| 2016/0295625 A1 * | 10/2016 | Zhang .............. | H04W 76/14 |
| 2016/0364003 A1 * | 12/2016 | O'Brien ........... | G03H 1/0005 |
| 2018/0307909 A1 * | 10/2018 | O'Brien ........... | G06F 3/0426 |

* cited by examiner

*Primary Examiner* — Tu T Nguyen
(74) *Attorney, Agent, or Firm* — Merchant & Gould P.C.

(57) ABSTRACT

Virtual reality for network configuration may be provided. First, topology data corresponding to a network may be received. Next, a Virtual Reality (VR) representation of the network may be displayed on a VR user interface device based on the received topology data. Changes to the network may be received from a user through the VR user interface device. Effects on behavior of the network that would result in response to the received changes may then be displayed in the VR representation of the network on the VR user interface device.

20 Claims, 4 Drawing Sheets

VIRTUAL REALITY FOR NETWORK CONFIGURATION AND TROUBLESHOOTING

TECHNICAL FIELD

The present disclosure relates generally to network configuration and troubleshooting.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Virtual reality for network configuration may be provided. First, topology data corresponding to a network may be received. Next, a Virtual Reality (VR) representation of the network may be displayed on a VR user interface device based on the received topology data. Changes to the network may be received from a user through the VR user interface device. Effects on behavior of the network that would result in response to the received changes may then be displayed in the VR representation of the network on the VR user interface device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Network operators may have better access to network information than ever before. However, with more data available, the challenge of monitoring, maintaining, and visualizing the network may become even more challenging. For example, there may not be a way to manage and visualize a network globally and holistically based on performance metrics, configuration, context, identity of devices, identity of users, and threat vectors for example.

In conventional networking, individual device configuration may be performed, for example, using either a Command Line Interface (CLI) or an abstracted command interface (e.g., a Graphical User Interface (GUI) with web-like CLI representations or intent-based instructions). However, even intent-based systems may be limited to representing sets of text commands (e.g., individual switch Quality of Service (QoS) configuration, such as "service-policy xyz") as another string of text instructions (e.g., "assign priority to voice"). The result of such conventional processes may be that a user may need to learn a textual representation code. In some ways, network programming may have evolved from a low-level language (e.g., C type) to a more evolved language (e.g., Python type), but may still remain a programming language. Embodiments of the disclosure may overcome this by leveraging Virtual Reality (VR) as a configuration medium where intent may be used without command intermediation to express configuration.

Similarly, with conventional networking, troubleshooting may be performed using either a CLI or an abstracted monitoring interface (e.g., a GUI with web-like CLI representations, error message displays, low-level function state representations, and template-based configuration instructions). However, these conventional processes may be limited in that they may represent individual objects (e.g., routers and switches) or functions configured or analyzed at a scale of the objects. The result may be that the user may not be able to interact in an intuitive way with an entire network to troubleshoot flows and functions rather than individual elements. Embodiments of the disclosure may leverage a user interface and VR to allow the user to interact with the network as a whole, and be able to identify and fix issues visualized in the network functions or performances.

In other words, embodiments of the disclosure may allow a user to travel through a complex information set using VR that may allow interaction with a network in a visual and intuitive way that may allow: i) configuration according to intent; and ii) quick identification and troubleshooting of problems.

Figure 1:
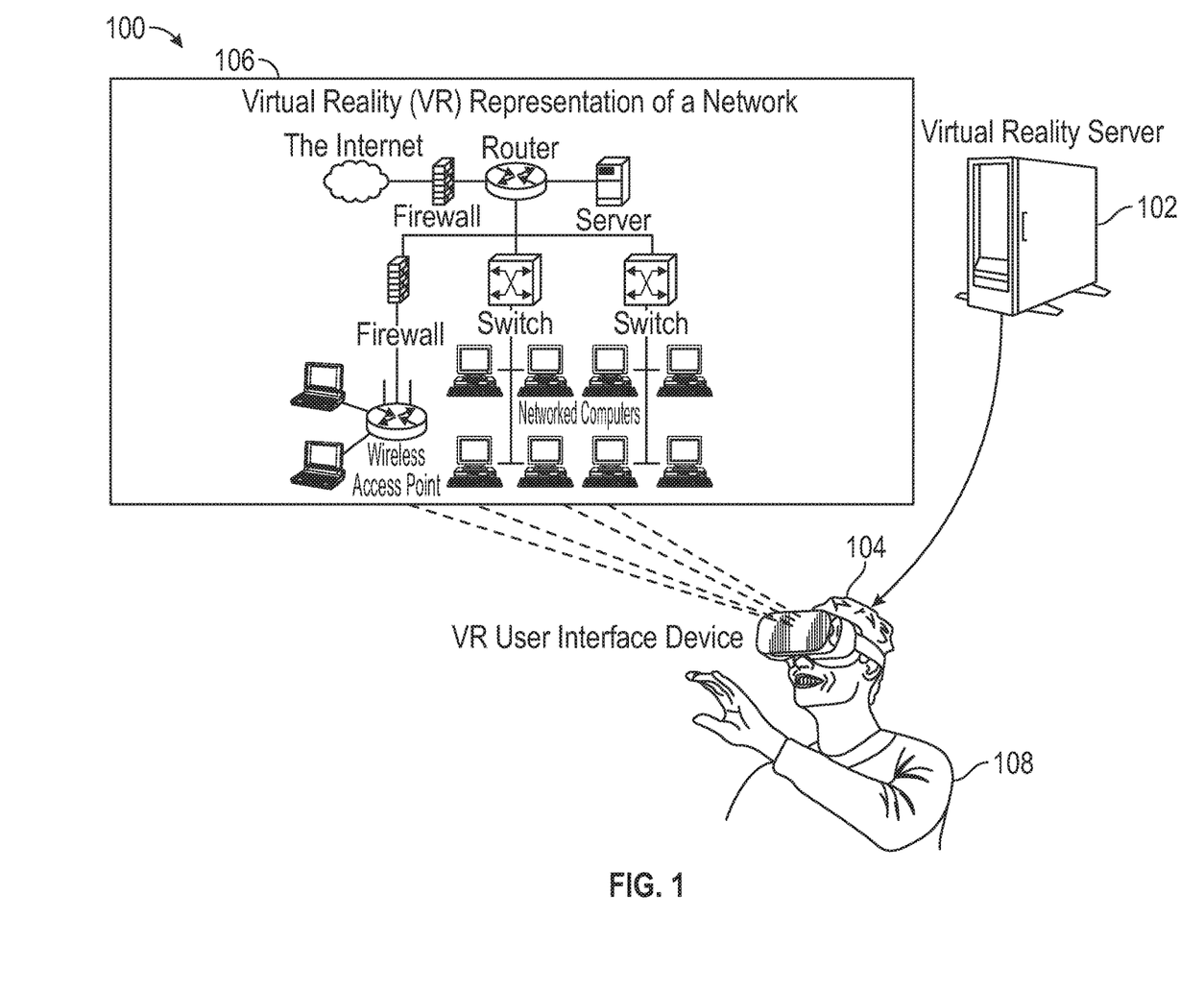
FIG. 1 is a block diagram of a system for providing virtual reality for network configuration and troubleshooting.

FIG. 1 is a block diagram of a system 100 for providing virtual reality for network configuration and troubleshooting. As shown in FIG. 1, the system 100 may comprise a Virtual Reality (VR) server 102, a VR user interface device 104, and a VR representation 106 of a network. VR user interface device 104 may be operated by a user 108.

VR user interface device 104 may comprise a virtual reality headset comprising, for example, a head-mounted device that may provide virtual reality for the wearer (i.e., user 108). VR user interface device 104 may comprise a stereoscopic head-mounted display that may provide separate images for each eye of user 108, speakers to provide stereo sound to user 108, and head motion tracking sensors (e.g., gyroscopes, accelerometers, and structured light systems) that may track motion of user 108's head. Eye tracking sensors may also be included in VR user interface device 104 to track the movement of user 108's eyes. Accordingly, user 108 may view a display (e.g., a three dimensional display) of content provided by VR server 102 and may provide feedback to VR server 102 in response to the displayed content via VR user interface device 104.

System 100 may also be in haptic (i.e., kinesthetic) communication with user 108. For example, user 108 may be wearing haptic gloves that may provide VR server 102 (e.g., through a wired or wireless connection) with finger, hand, or arm motion information corresponding to user 108. This information may be communicated by the haptic gloves through VR user interface device 104 to VR server 102, or may be communicated by the haptic gloves directly to VR server 102. VR server 102 may communicate back to user 108 via vibration or force to user 108's fingers or hands via the haptic gloves.

Furthermore, VR user interface device 104 or VR server 102 may comprise sensors that may detect, for example, finger, hand, foot, leg, or arm motion information corresponding to user 108. Accordingly, user 108 may provide feedback (e.g., finger, hand, foot, leg, or arm motion information feedback) to VR server 102 without being in direct contact with a physical input device.

Elements of system 100 (i.e., VR server 102 and VR user interface device 104) may be practiced in hardware and/or in software (including firmware, resident software, microcode, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 4, elements of system 100 may be practiced in a computing device 400.

Figure 2:
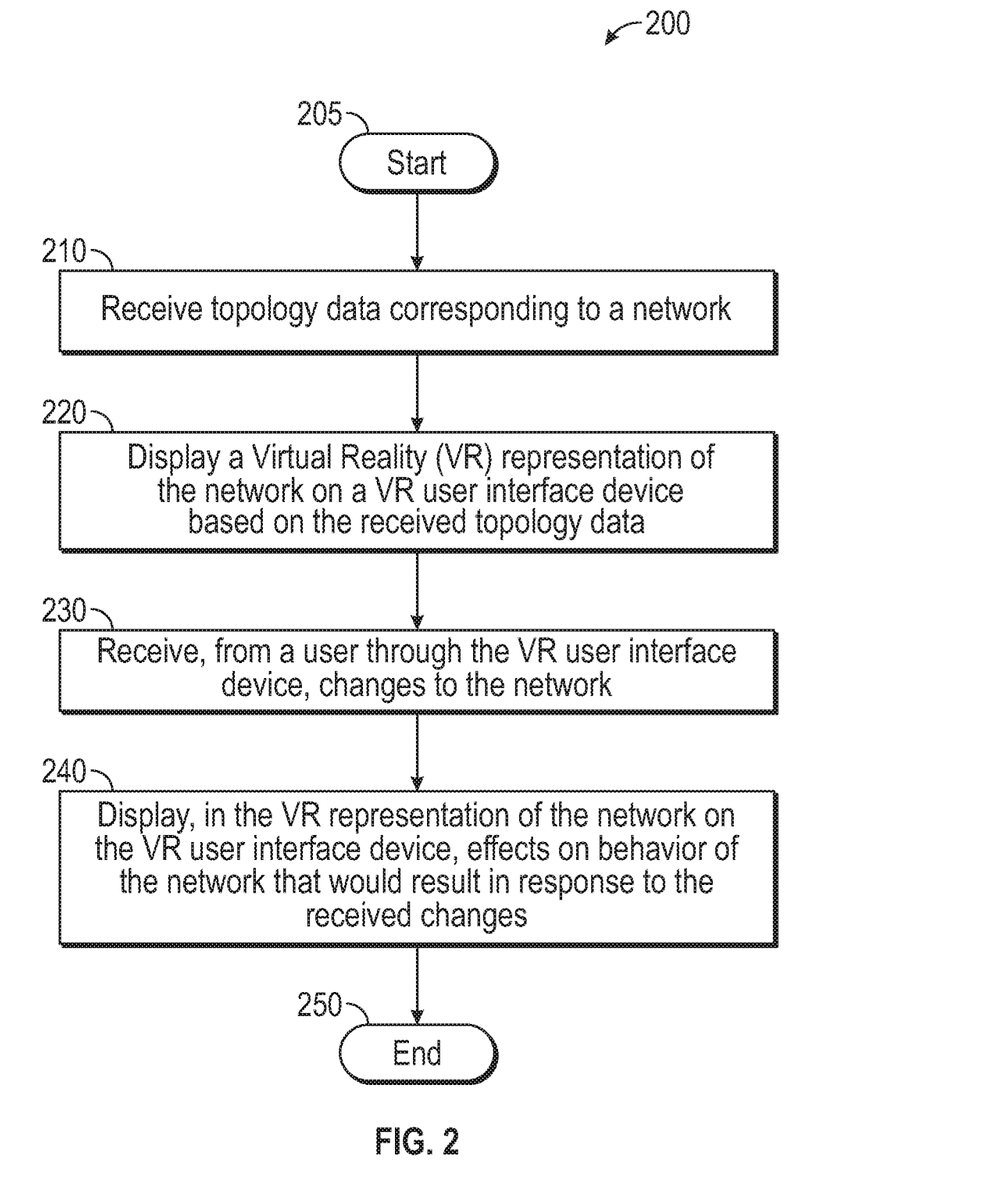
FIG. 2 is a flow chart of a method for providing virtual reality for network configuration.

FIG. 2 is a flow chart setting forth the general stages involved in a method 200 consistent with an embodiment of the disclosure for providing virtual reality for network configuration. Method 200 may be implemented using a virtual reality server 102 as described in more detail above with respect to FIG. 1. Ways to implement the stages of method 200 will be described in greater detail below.

For intent-based networking, for example, a goal may be to allow a user who may not be a networking expert to describe their intent, understand and analyze the implications of their intent on the network, and make any necessary adjustments. With embodiments of the disclosure, the network may be expressed as a visual metaphor that the user may interact with, and where the user may provide input using, for example, speech, hand movements, body movements, and object movements for example.

Method 200 may begin at starting block 205 and proceed to stage 210 where virtual reality server 102 may receive topology data corresponding to a network. For example, a network topology may be imported by VR server 102. The topology may, for example, be imported through network diagrams or may be imported dynamically through a VR tool (e.g., a software module running on VR server 102) that may learn the topology, such as a network management and command center. Devices in the topology (e.g., routers, Access Point (APs), switches, and firewalls) may be represented in such a way that the VR tool may identify the devices. For example, as a result, a switch that may be seen through VR user interface device 104 may appear with an identifying label (e.g., "Eth1/1", "status LED", "C9300-24T", or "Access Switch 1"). With the device identity learned, the VR tool may be able to import current configuration and log information from other tools (e.g., such as network management and command center assurance, Syslogs, Security logs, etc.) that may be available to VR server 102.

From stage 210, where virtual reality server 102 receives the topology data corresponding to the network, method 200 may advance to stage 220 where virtual reality server 102 may display VR representation 106 of the network on VR user interface device 104 based on the received topology data. For example, devices on the network may be represented in VR representation 106 (e.g., a polygon rendering of the topology) such that user 108 may see the network as a living topology in VR user interface device 104. A series of networking and configuration function representations may be overlaid as haptic holograms over images of devices in the network shown in VR representation 106, such as interfaces or features (e.g., routing, security, QoS, etc.). User 108 may, for example, select one or more of these functions by virtual touch or by speech. Consistent with embodiments of the disclosure, a hologram may comprise, but is not limited to, any form of a visual overlay in a VR context providing, for example, mono viewing or stereo viewing.

In the case of a single interface configuration, the interface may be represented, for example, as black when unconfigured and in shutdown state. An on/off switch may be visualized in VR representation 106 and may be used to enable (not shut) or disable (shut) the interface. The interface, for example, may have a visual representation (i.e., turn a color (e.g., green)) if it successfully comes up, or may have another visual representation (i.e., turn to another color (e.g., grey, amber, etc.)) when enabling the interface fails because of a missing configuration component for example.

Once virtual reality server 102 displays VR representation 106 of the network on VR user interface device 104 based on the received topology data in stage 220, method 200 may continue to stage 230 where virtual reality server 102 may receive, from user 108 through VR user interface device 104, changes to the network. For example, in a production configuration environment, a checklist (e.g., virtual menu) may be displayed upon selecting an interface configuration feature (e.g., such as "connect", "secure", "optimize traffic", etc.). In a virtual environment, the interface configuration function may be represented with symbols (e.g., interface as a door or valve, security/ACL as a filter or insect mesh, QoS as aperture width for each type of traffic represented as flows or colors, etc.). User 108 may then be guided through various elements required, for example, before unlocking the door/valve. This virtual representation may help the learning experience by transposing network requirements into environmental functions that may be more familiar to user 108. User 108 may also grab a configuration block (or its symbolic representation) crumple it, and toss it away to remove it from the configured object. Specific gestures (e.g., slamming a door or other gesture) may be used to apply the configuration to the real network object and reboot it.

More advanced configurations may also be possible using the VR environment of FIG. 1. For example, it may be possible to use VR hand-motions to create service chains between network functions. In this case, the hand motions may draw lines indicating the service chain to be used between virtual network functions. As the lines are drawn, their properties may be defined through virtual pop-ups indicating Virtual Local Area Network (VLAN) assignments, security settings, etc. This may apply both to virtualized network functions as well as microservice/container service chaining for example.

In the context of training, an instructor may use another VR user interface device to observe and guide the work of the student (e.g., user 108), providing haptic feedback or instructions, such as coloring elements, moving elements to the forefront or unlocking elements as previous required elements are completed. The instructor may also demonstrate the configuration steps by demonstrating the correct sequence. For example, a subnet may be represented as a tube with each address as a sub-segment. The instructor may demonstrate the impact of a mask by unfolding a single segment and showing the importance of a gateway by showing how the information needs to exit the tube, and show how this visual representation translates into command lines. In an automated learning environment, functions required for a given exercise may be highlighted (e.g., green vs. red, or haptic feedback, such as resistance to virtual touch when the wrong function is selected).

When symbolic representation is used, textual feedback may be used to help the learning process. At a high level, feedback may take the form of short sentences explaining the purpose and need of each sub-function; at a low level, the feedback may take the form of a set of CLI commands generated by the action on virtual components.

Discovery functions may be used to provide guidance on the functions to perform. For example, features such as a data link layer protocol may be used to discover neighboring devices and provide further guidance. For example, when an interface is to be configured, awareness of neighbor configuration may be used to display an IP address partially configured, letting user 108 use a dialer/quadrant to refine the host value or the network (mask, GVV) settings.

Similar principles may be used for Access Control Lists (ACLs) or QoS. When IP Network-Based Application Recognition (NEAR) protocol discovery is used, the detected traffic may be displayed as labelled multiple layers in a pipe. The fullness of the pipe may represent the ratio between the volume of traffic and the interface capability. A label may be textual or symbolic (e.g., camera for video, etc.). User 108 may then use a dialer or a quadrant to increase or decrease the allocated bandwidth for each type of traffic, allow/deny, use symbolic painting to remark (e.g., voice/EF is purple on a virtual palette, the admin selects that color to paint the traffic labelled "Spark Audio" displayed in the pipe). When routing is being configured, neighbor awareness may display the various routing protocols enabled onto the network neighbors. Active protocols may be brighter or a different color. Interfaces configured on a local router may be listed, allowing user 108 to virtually touch (red/green) segments to advertise in the routing protocol.

The same logic may be applied to VLAN configurations, where access/trunk may be visualized as progressively opening an object (i.e., displaying a single VLAN whose number may be picked on a dialer, from a full list or a shorter list based on the detected VLANs, and switching to trunk when more than one VLAN is selected on the dialer or when the object opens wider than a single VLAN).

After virtual reality server 102 receives, from user 108 through VR user interface device 104, changes to the network in stage 230, method 200 may proceed to stage 240 where virtual reality server 102 may display, in VR representation 106 of the network on VR user interface device 104, effects on behavior of the network that would result in response to the received changes. For example, in the context of training, a specific symbol may be represent a successful configuration (e.g., a green light, temporal checkmark, etc.), showing a match between the instructions and the configuration performed. Similarly, a challenge or bug introduced to the object may be represented visually (e.g., a rodent eating a configuration block or part of a network object, with associated haptic feedback). In a production environment, the same symbolic system may be used to represent a functional (or dysfunctional) configuration. The result of the visualized object manipulation may then be translated into actual CLI commands and deployed to actual networking devices.

In a production environment, the verification or validation that the network is behaving as intended may be visually conveyed to user 108. Any locations in the network that may not be behaving as intended, may also be visually identified to user 108. Furthermore, a root cause of the trouble may be identified to user 108. Moreover, recommended corrective actions may be visually and audibly communicated to user 108, who may then decide whether or not to activate (e.g., via verbal or gestural responses for example). Once virtual reality server 102 displays, in VR representation 106 of the network on VR user interface device 104, effects on behavior of the network that would result in response to the received changes in stage 240, method 200 may then end at stage 250.

Accordingly, embodiments of the disclosure may provide a representation of networking configuration elements as symbolic objects (e.g., valves, filters, pipes, etc.) displayed through a VR device. Configuration of networking elements and service chaining may be achieved by either manipulating the provided symbolic objects, or by configuring functions represented as visual literal objects laid over the symbolic objects. Embodiments of the disclosure may also provide interactions with an instructor where the instructor may either explain networking concepts through literal or symbolic element manipulation, or may train students through supervised student exercises. The result of the configuration generated through embodiments of the disclosure may appear as a CLI result, and may be deployed to actual (or virtual) networking objects.

Figure 3:
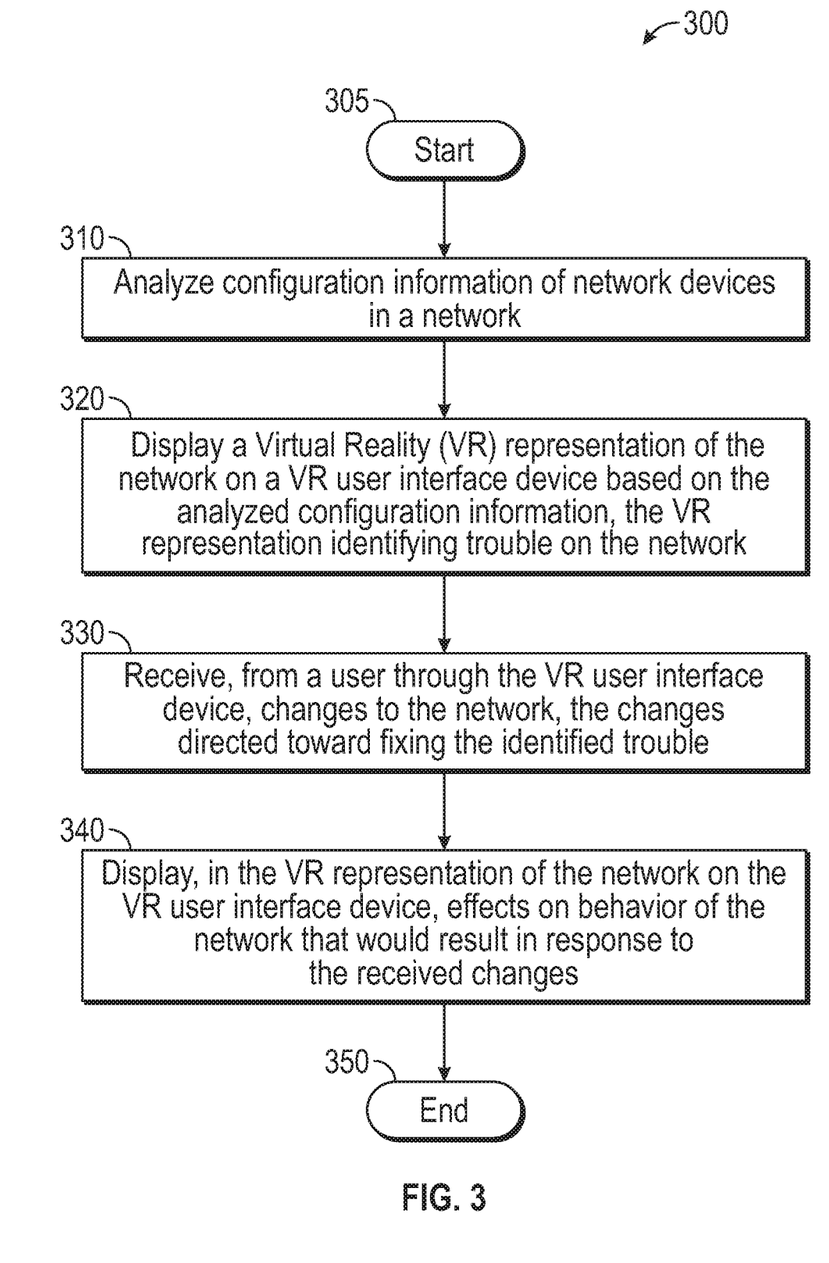
FIG. 3 is a flow chart of a method for providing virtual reality for network troubleshooting.

FIG. 3 is a flow chart setting forth the general stages involved in a method 300 consistent with an embodiment of the disclosure for providing virtual reality for network troubleshooting. Method 300 may be implemented using VR server 102 as described in more detail above with respect to FIG. 1. Ways to implement the stages of method 300 will be described in greater detail below.

Method 300 may begin at starting block 305 and proceed to stage 310 where VR server 102 may analyze configuration information of network devices in a network. For example, the configuration information may be imported by VR server 102. The configuration information may, for example, be imported to an analytics engine (e.g., a software module running on VR server 102) that may receive the configuration from a network management and command center. Devices in the configuration (e.g., routers, Access Point (APs), switches, and firewalls) may be represented in such a way that the analytics engine may identify the devices.

From stage 310, where VR server 102 analyzes the configuration information of network devices in the network, method 300 may advance to stage 320 where VR server 102 may display VR representation 106 of the network on VR user interface device 104 based on the analyzed configuration information. VR representation 106 may identify trouble on the network. For example, the analytics engine may retrieve the configuration of each network device, and convert configuration parameters into a symbolic representation (e.g., Routing Information Protocol (RIP)=purple, Enhanced Interior Gateway Routing Protocol (EIGRP)=blue, Open Shortest Path First (OSPF)=orange, etc.). The analytics engine may also group sets of commands into a symbolic representation (e.g., a color, an object, or a shape). When a specific function is chosen, a web color may change to display segments (i.e., lines) or objects where such a function or set is implemented.

A different code may be used to represents segments, or objects, where the function may need to be reviewed by user 108. Such a need may occur in locations in the network where the analytics engine has surfaced trouble (e.g., errors or warning messages relevant to the function chosen). For example, user 108 may choose to troubleshoot the effect of ACLs on a target network traffic type. The set of ACLs affecting the target traffic may be represented as a symbol (e.g., a red wall when blocking, a yellow wall when restricting in some way other than blocking, and a green wall when allowing that target traffic without restriction).

Such need for review may also occur in locations where the analytics engine has identified a configuration block (e.g., set of commands) different from that of analog objects in the network. For example, a single router may have been configured for QoS using a legacy method, while the other routers may have been configured using Modular QoS CLI (MQC). The single router may be represented differently (e.g., blinking amber, etc.). The analytics engine may in this way collect configuration blocks from network objects, count and compare the block structure (e.g., commands used), and highlight objects of lower count where the block structure is different from the larger group. Similarly, the analytics engine may compare each object's configuration to best practices, validated designs, or other reference configuration repositories, and highlight differently objects that may have configurations that deviate from the reference source.

Links between devices in VR representation 106 may also be visualized as pipelines. Instead of showing straight lines, the links may be given a relative size to each other (e.g., 1GE=thin line, 10GE=medium, 100GE=thick line). Using VR user interface device 104, by tapping on a link, it may be possible to see the actual traffic volume in each direction verse the pipe size (i.e., like seeing how full a pipe is). Other representations may also be possible (e.g., slow rippling for small bandwidth or low traffic volume, faster or larger rippling amplitude for large BW or large traffic volume, etc.).

Once VR server 102 displays VR representation 106 of network on VR user interface device 104 in stage 320, method 300 may continue to stage 330 where VR server 102 may receive, from user 108 through VR user interface device 104, changes to the network. The changes may be directed toward fixing the identified trouble. For example, when user 108 connects in order to troubleshoot, a general menu may be displayed to user 108 that may list issues (e.g., trouble) reported by the analytics engine by order of severity. User 108 may then select one or more issues to highlight the network areas or objects impacted by this issue. Similarly, when user 108 may need to assess performances, areas or objects where the chosen observed performances are different from the network average may appear in different colors.

Because VR representation 106 may operate in 3D, functions may appear as connected sets of objects. For example, a routing configuration may be represented as a ball comprising several segments, each representing a sub-function (e.g., activating routing, choosing protocol, announcing route segments, establishing peering with neighbors etc.). In the 3D space, the objects may be semi-transparent, and the attention of user 108 alerted when one or more components are generating the error messages (e.g., rotating the routing function ball may show that all components are green, except a slice called "announce network 10.10.10.0/24", which may be labelled as red (touching virtually this slice may display a message in space labelled "subnet not found")). Similarly, objects where configuration of interest is detected may appear in a 3D subspace, while the rest of the network may be removed from view, thus allowing user 108 to focus on the network elements pertinent to the issue at hand (i.e., the trouble), without having to manage the view of the rest of the network.

VR representation 106 may also be used to improve path trace analysis. For example, user 108 may need only touch two different network elements (i.e., devices) and a colored path may appear between these two elements. Similarly, user 108 may verbally name a source and destination and embodiments of the disclosure may highlight the source and destination nodes, and the paths between them (forward and reverse paths may be different, as well as multiple paths may be used in each direction), and various important attributes relevant for debugging such as queue lengths, packet drops, etc, may be visually identified. Attributes that may be working as desired may be deemphasized (e.g., in a gray color), while attributes that are problematic may be emphasized (e.g., in a color such as red or blue) to make it easier for user 108 to see the issues. Accordingly, embodiments of the disclosure may simplify a large amount of complex information so that user 108's limited attention and scope of understanding may be focused on the key attributes that need to be addressed for example.

Haptic feedback may also be used to help the troubleshooting process. For example, user 108's finger may follow the virtual lines of the web (i.e., segments between network elements), and a haptic handle or glove may provide feedback (e.g., vibration or bump), when the local object configuration requires attention. A visual cue (e.g., user 108 continues moving a finger along the next segment, but the virtual finger displays a virtual stickiness to the object to review) may also help attract user 108's attention. Elements such as configuration mismatch (i.e., any element, such as routing, QoS or other), bandwidth mismatch, or boundary crossing may result in such haptic feedback. For example, user 108 may decide to troubleshoot voice configuration and bandwidth. Haptic feedback may provide a vibration when user 108's virtual finger follows a link where bandwidth is not sufficient or is lower than other links. Vibration intensity may be tuned to mark different levels of changes between consecutive links for example.

After VR server 102 receives, from user 108 through VR user interface device 104, changes to the network in stage 330, method 300 may proceed to stage 340 where VR server 102 may display, in VR representation 106 of the network on VR user interface device 104, effects on behavior of the network that would result in response to the received changes. For example, as described above upon pinching and zooming, user 108 may look at the local object configuration in VR representation 106, and proceed to change it. Then, once the change has been made, user 108 may explore a what-if scenario, and attempt to test this new configuration onto other network objects. The new configuration block may be a set of CLI commands or a symbolic representation of these commands. User 108 may virtually touch the new configuration block, and slide it toward another network object. Haptic, visual and/or audio feedback may provide information on whether such a configuration would be functional on the new object.

In a similar manner, user 108 may make a gesture of opening arms widely to generalize this configuration to the entire network. Feedback may provide information on areas or objects where such a configuration may be difficult or result in issues (e.g., configuration visually bounces against an object where the configuration block cannot be extended, and/or network objects changes color or blinks when configuration extension requires further configuration or attention). Audio and haptic feedback may also be used. Similarly, user 108 may virtually toss away a configuration block (or its symbolic representation) to examine the flow changes if that piece of configuration was removed. Similarly, user 108 may take a link between two objects (representing a physical segment), snap it to stop the connection or the flow, then pull the virtual line to plug it into another object to test another connection. In the same logic, user 108 may plug the virtual line through a configuration block or its symbolic representation (like threading a needle) to apply the configuration block to the object at the end of the line.

Upon configuration modification and deployment, the visual configuration block may be converted into actual CLI commands that may be pushed to the network objects visualized in VR representation 106. Once VR server 102 displays, in VR representation 106 of the network on VR user interface device 104, effects on behavior of the network that would result in response to the received changes in stage 340, method 300 may then end at stage 350.

Accordingly, embodiments of the disclosure may provide a representation of network issues (i.e., trouble) as symbolic objects (e.g., colors, shapes, etc.) displayed through an AR/VR system. Issues may be displayed through symbolic representation as the user zooms in or out. An analytics engine may convert configuration blocks into symbols. Feedback may be provided as configuration changes are made, and extended through specific gestures to other network objects or the entire network. The resulting symbolic representation of the configuration may then be converted back into command blocks and applied to the network objects.

Figure 4:
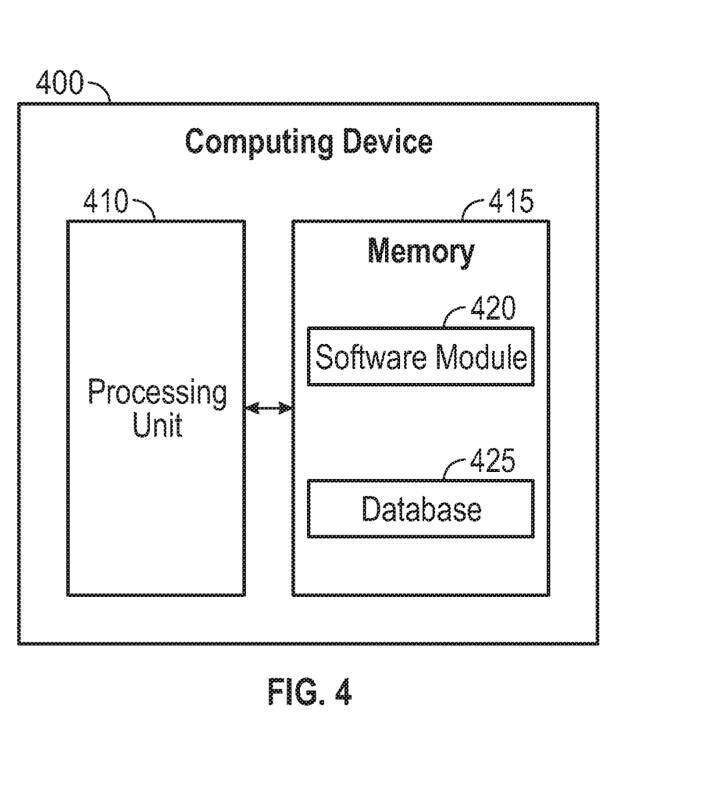
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing virtual reality for network configuration and troubleshooting, including for example, any one or more of the stages from method 200 described above with respect to FIG. 2 or any one or more of the stages from method 300 described above with respect to FIG. 3. Computing device 400, for example, may provide an operating environment for virtual reality server 102. Virtual reality server 102 may operate in other environments and is not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving topology data corresponding to a network;
   displaying a Virtual Reality (VR) representation of the network on a VR user interface device based on the received topology data, wherein displaying the VR representation of the network comprises displaying a three dimensional living topology rendering of the network, and wherein displaying the VR representation of the network comprises:
      overlaying, in the VR representation of the network, a haptic hologram over an image of a device in the network, the haptic hologram providing a stereo viewing of networking and configuration functions, and
      overlaying, in the VR representation of the network, another hologram corresponding to an interface in the network;
   providing the user with a haptic feedback when the user traces an object in the VR representation needs attention;
   receiving, from a user through the VR user interface device, changes to the network; and
   displaying, in the VR representation of the network on the VR user interface device, effects on behavior of the network that would result in response to the received changes.

2. The method of claim 1, wherein receiving the topology data further comprise importing configuration and log information corresponding to the network.

3. The method of claim 1, wherein the hologram indicates at least one of the following: a networking function corresponding to the device and a configuration function corresponding to the device.

4. The method of claim 3, further comprising receiving a response to the hologram from the user via at least one of the following: virtual touch and speech.

5. The method of claim 1, wherein the another hologram comprises a virtual representation of an on/off switch having an on position that enables the interface and an off position that disables the interface.

6. The method of claim 5, further comprising receiving a response to the another hologram from the user via at least one of the following: virtual touch and speech.

7. The method of claim 1, wherein the another hologram comprises a menu comprising a plurality of symbols respectively corresponding to different configuration functions of the interface.

8. The method of claim 7, further comprising receiving a response to the another hologram from the user via at least one of the following: virtual touch and speech.

9. A method comprising:
   analyzing configuration information of network devices in a network;
   displaying a Virtual Reality (VR) representation of the network on a VR user interface device based on the analyzed configuration information, the VR representation identifying trouble on the network, wherein displaying the VR representation of the network comprises displaying a three dimensional living topology polygon rendering of the network, and wherein displaying the VR representation of the network comprises:
      overlaying, in the VR representation of the network, a haptic hologram over an image of a device in the network, the haptic hologram providing a stereo viewing of networking and configuration functions, and
      overlaying, in the VR representation of the network, another hologram corresponding to an interface in the network;
   providing the user with a haptic feedback when the user traces an object in the VR representation needs attention;
   receiving, from a user through the VR user interface device, changes to the network, the changes directed toward fixing the identified trouble; and
   displaying, in the VR representation of the network on the VR user interface device, effects on behavior of the network that would result in response to the received changes.

10. The method of claim 9, wherein analyzing the configuration information of network devices further comprise converting configuration parameters into a symbolic representations, and wherein displaying the VR representation comprises displaying the symbolic representations.

11. The method of claim 9, wherein analyzing the configuration information of network devices further comprise grouping a set of commands into a symbolic representations, and wherein displaying the VR representation comprises displaying the symbolic representations.

12. The method of claim 9, wherein the VR representation identifying trouble on the network comprises identifying a location on the network with a configuration block different from that of analog objects in the network.

13. The method of claim 9, wherein the VR representation identifying trouble on the network comprises identifying an object on the network that has a configuration different from that of a reference configuration source.

14. The method of claim 9, wherein the VR representation identifying trouble on the network comprises providing the user with the haptic feedback when the user selects an object in the VR representation that needs attention.

15. A system comprising:
a memory storage; and
a processing unit coupled to the memory storage, wherein the processing unit is operative to:
 receive topology data corresponding to a network;
 display a Virtual Reality (VR) representation of the network on a VR user interface device based on the received topology data, wherein the processing unit being operative to display the VR representation of the network comprises the processing unit being operative to display a three dimensional living topology rendering of the network, and wherein the processing unit being operative to display the VR representation of the network comprises the processing unit being operative to:
  overlay, in the VR representation of the network, a haptic hologram over an image of a device in the network, the haptic hologram providing a stereo viewing of networking and configuration functions, and
  overlay, in the VR representation of the network, another hologram corresponding to an interface in the network;
 provide the user with a haptic feedback when the user traces an object in the VR representation needs attention;
 receive, from a user through the VR user interface device, changes to the network; and
 display, in the VR representation of the network on the VR user interface device, effects on behavior of the network that would result in response to the received changes.

16. The system of claim 15, wherein the processing unit being operative to receive the topology data further comprise the processing unit being operative to import configuration and log information corresponding to the network.

17. The system of claim 15, wherein the hologram indicates at least one of the following: a networking function corresponding to the device and a configuration function corresponding to the device.

18. The system of claim 17, wherein the processing unit is further operative to receive a response to the hologram from the user via at least one of the following: virtual touch and speech.

19. The system of claim 15, wherein the another hologram comprises a virtual representation of an on/off switch having an on position that enables the interface and an off position that disables the interface.

20. The system of claim 15, wherein the another hologram comprises a menu comprising a plurality of symbols respectively corresponding to different configuration functions of the interface.

* * * * *